United States Patent Office 3,304,831
Patented Feb. 21, 1967

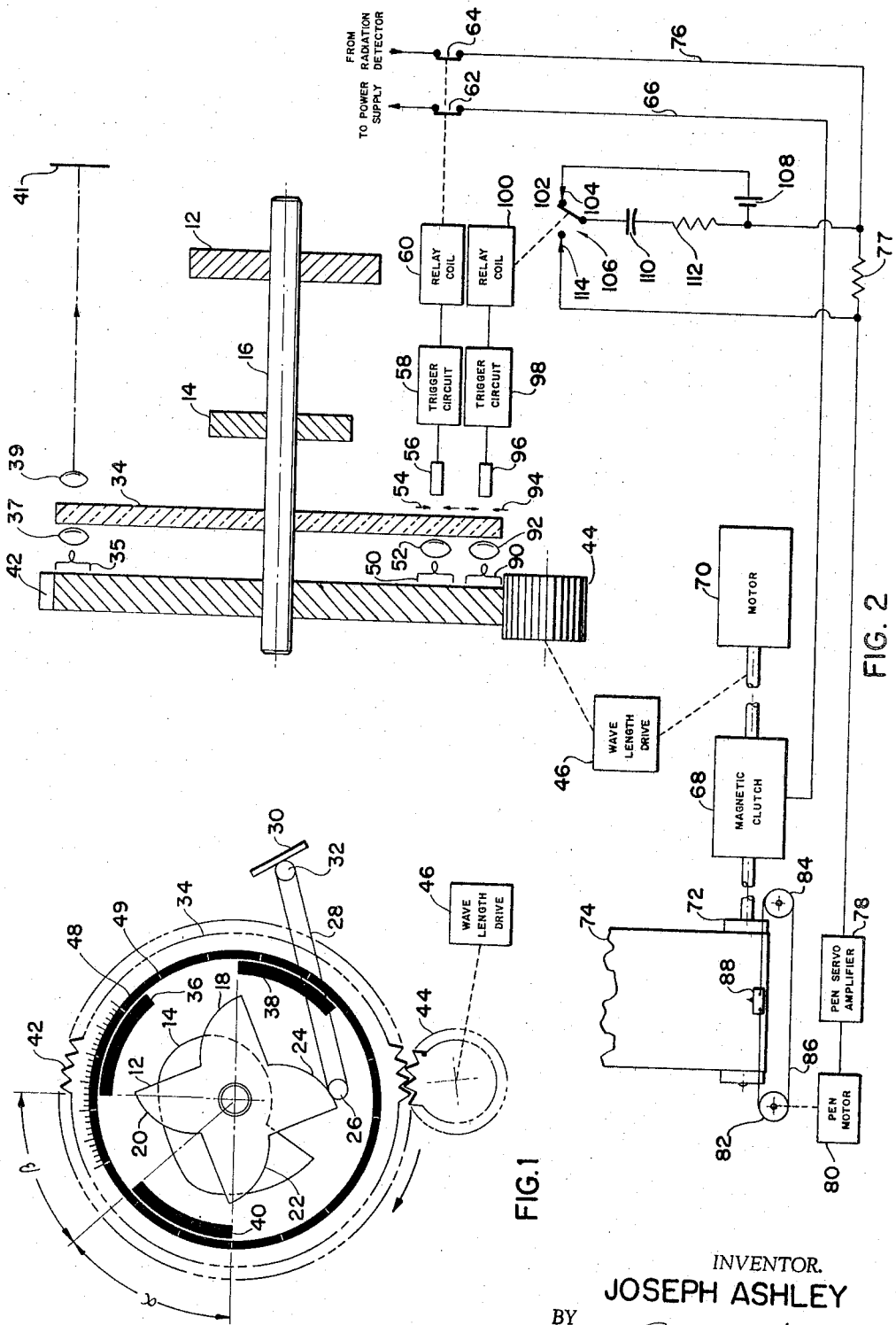

3,304,831
CONTINUOUS SPECTRAL RECORDING SPECTROPHOTOMETER
Joseph Ashley, La Habra, Calif., assignor to Beckman Instruments, Inc., a corporation of California
Continuation of application Ser. No. 175,460, Feb. 26, 1962. This application Dec. 31, 1962, Ser. No. 248,477
8 Claims. (Cl. 88—14)

This application is a continuation of application Serial No. 175,460, filed February 26, 1962, now abandoned, and assigned to the assignee of the present application.

This invention relates to spectrophotometers and more particularly relates to an improved recorder and wavelength drive system for spectrophotometers.

In U.S. Patent No. 2,948,185, issued August 9, 1960, to William M. Ward and Joseph Ashley and assigned to the assignee of the present application, there is disclosed a spectrophotometer having a prism-grating monochromator operable over several orders of the grating and having a simple mechanism for coordinating automatically the wavelength selective action of the prism with the grating.

In this patent, first and second cams are fixedly mounted on a common shaft, the first cam cooperating with a cam follower and a suitable linkage mechanism to control the position of the grating and the second cam cooperating with a second linkage mechanism to control the position of a Littrow mirror associated with the prism. The grating cam has a plurality of angular excursions or lobes, each having a suitably dimensioned forward or working surface and a reverse or reset surface, which cause the grating to rotate through a plurality of oscillatory cycles for each revolution of the cam, each cycle traversing a different order of the grating. The mirror cam produces one oscillatory cycle of the mirror in one revolution and has a forward working surface and a reset surface. The forward or working surface of the mirror cam includes a number of slightly indented surfaces corresponding to the reverse surfaces of the grating cam which provide slight reverse motion of the mirror while the grating is moving through the reverse portions of its oscillatory cycles.

A third cam is mounted on the common shaft and is provided with high zones corresponding to the forward or working excursions of the grating cam and low zones corresponding to the reverse excursions. These zones act to operate a relay which deactivates the chart marking pen during the reverse excursions of the grating, leaving gaps or blank intervals on the record between successive orders, the blank intervals corresponding to the reverse or reset periods of the grating oscillatory cycles during which the pen is held inoperative.

The indentations in the working surface of the mirror cam cause the mirror cam to slightly reverse while the grating cam follower is following a reverse surface of the grating cam resulting in an overlapping of the individual spectral ranges at each side of each of the gaps or blank intervals between the various orders, thus assuring that there will be neither blank wavelength areas in the record nor the problem of closely matching the ends of adjoining wavelength ranges. The record thus produced is shown in FIG. 4 of the above-cited patent. While this system has been completely satisfactory in operation, there are various situations in which it would be more convenient to obtain a record having no blank intervals between the successive orders, but rather a complete spectral record.

According to the present invention, it has now been found that apparatus may be provided that eliminates these blank intervals between orders on the recording. This apparatus includes an optical disc mounted on the shaft common to the cams, and a sensing circuit for producing a signal indicative of the position of the optical disc. The signal produced by the sensing circuit causes the de-energization of the chart drive motor and the pen servo motor so that no record is made on the chart during the time that the grating cam is operating on its reverse or reset surfaces. The apparatus may also conveniently be provided with means for making wavelength markings on the chart to insure an accurate record, free from errors caused by paper stretch and the like. The present invention enables a continuous spectrum to be recorded in which the end of one order, the beginning of the next order, and their relationship to subsequent orders may be locked in with extreme accuracy and reliability with the frequency readout.

It is therefore a primary object of the present invention to provide a spectrophotometer operable over several orders and producing a continuous spectral recording.

It is another object of the present invention to provide apparatus in a recording spectrophotometer for preventing recorder operation during non-scanning periods.

It is also an object of the present invention to provide a sensing circuit responsive to the position of a grating cam for preventing operation of a recorder during operation of the cam on its reverse or reset surfaces.

It is a further object of the present invention to provide apparatus in a recording spectrophotometer for producing a continuous and accurate spectral recording, the apparatus including an optical disc having patterns placed thereon for controlling the operation of the recorder chart drive mechanism and the recorder pen.

These and further objects and advantages of the invention will become more apparent upon reference to the following specification and claims and appended drawings wherein:

FIG. 1 is a front elevation of the cam system of the present invention; and

FIG. 2 is an illustration, partly in section, of the interconnection between the mechanical, optical and electrical portions of the present invention.

Referring now to the several figures, there is shown a cam and shaft assembly similar to that disclosed in the aforementioned U.S. Patent No. 2,948,185. A grating cam 12 and a mirror cam 14 are fixedly mounted on a common shaft 16. The grating cam 12 is provided with a plurality of working surfaces 18, 20, 22 and 24. These working surfaces cooperate with a cam follower 26 mounted on a linkage bar 28 to cause the grating 30 to oscillate about a pivot point 32 through a plurality of angular excursions. The operation of this cam, linkage and grating is fully explained in the aforementioned patent. The cam 14 may be used to drive a mirror through a suitable linkage as disclosed in Patent No. 2,948,185 or alternatively, it may be used to drive a filter controlling system if it is desired to provide a filter-grating spectrophotometer rather than a prism-grating spectrophotometer.

A transparent disc 34 constructed of glass or a suitable plastic material is also fixedly mounted on the shaft 16 so that the angle through which it rotates will be identical to the angle through which the cams 12 and 14 rotate. A plurality of opaque areas 36, 38 and 40 are mounted, etched or otherwise suitably formed on the disc 34 forming a pattern for a purpose that will be explained more fully hereinbelow. A drive gear 42 is fixedly mounted on the shaft 16 and serves to rotate the shaft and the various cams and disc mounted thereon. The gear 42 may be of any suitable type and may be driven by a second gear 44 which represents the last gear in a suitable wavelength drive 46. The wavelength drive is powered by a motor as will be more fully explained in connection with FIG. 2.

The transparent disc 34 is also provided with suitable wavelength indicia on its outer periphery. As disclosed and claimed in U.S. patent application Serial No. 175,489, filed February 26, 1962, now abandoned, entitled "Wavelength Projection System," by Billie D. Henderson, and assigned to the assignee of this application, this indicia may be used as a part of a system for projecting the wavelength setting of the monochromator to a remote point with great accuracy, thereby facilitating its correct reading. The system generally comprises a radiation source 35, and a condenser lens 37 positioned on one side of the transparent disc 34 and a projection lens 39 for projecting the wavelength indicia on a screen 41 through any suitable mirror arrangement, not shown. The disc 34 is further provided with a second opaque pattern 48 formed thereon by etching or other suitable methods. This pattern 48 is provided with a numbr of narrow transparent portions or breaks 49 that are preferably aligned with the wavelength indicia, for example, the pattern 48 may be provided with a transparent break every ten wavelength numbers. The function of this pattern and the apparatus associated therewith will be more fully explained hereinbelow.

Referring now to FIG. 2, there is shown a side view, partly in section, of the cam and shaft assembly of FIG. 1 showing the cams 12 and 14, the transparent disc 34 and the drive gear 42 mounted on the shaft 16. An appropriate source of radiation 50, for example, an incandescent lamp, is positioned adjacent the disc 34 and the radiation beam emanating therefrom is focused by a lens 52 onto the disc 34 in an area in which the transparent portions of the disc will periodically be replaced by the opaque portions 36, 38 and 40 as the cam and shaft assembly rotates. On the opposite side of the disc 34, positioned at a level with the light source 50, is a slit 54 which passes a desired portion of the beam of radiation passing through the disc to a radiation detector 56 of any appropriate type, for example, a cadmium selenide cell.

The electrical output of the radiation detector 56 is connected to the input of a trigger circuit 58. The trigger circuit 58 may be of any well-known type, for example a Schmidt trigger, suitably arranged to produce an output signal upon the disappearance of its input signal. The output of the trigger circuit 58 energizes or controls the energization of a relay coil 60. Energization of the relay coil in response to the trigger circuit output signal acts to open a pair of normally closed relay contacts 62 and 64. The relay contact 62 is connected in a line 66 which leads from a suitable power supply (not shown) to a magnetic clutch 68 of any appropriate type. The magnetic clutch 68 acts upon energization to mechanically couple a drive motor 70 with a chart drive mechanism 72 which is suitably attached to and drives a recorder chart 74. The drive motor 70 is also operatively coupled with the wavelength drive 46 and drives the cam and shaft assembly through the gears 44 and 42.

The relay contact 64 is connected in a line 76 leading from the usual spectrophotometer radiation detector and its associated circuitry (all of which is well known in the art and therefore not shown) through a resistor 77 to the pen servo amplifier 78 and pen motor 80. The pen motor 80 is mechanically coupled to a drive pulley 82 which cooperates with an idler pulley 84 and a belt 86 to move the pen 88 across the chart 74 in response to the output of the pen servo amplifier 78 in the well-known fashion.

A second source of radiation 90 is also positioned adjacent the disc 34 a suitable radial distance from the shaft 16 so that the beam of radiation emanating from the source 90 is focused by a lens 92 onto the disc 34 in an area occupied by the pattern 48. On the opposite side of the disc 34, positiond at a level with the source 90, is a slit 94 which passes a desired portion of the beam of radiation passing through the transparent portions 49 of the pattern 48 to a radiation detector 96, which may also be a cadmium selenide cell.

The electrical output of the radiation detector 96 is connected to the input of a trigger circuit 98 similar to the trigger circuit 56 except arranged to produce an output signal upon the occurrence of an input signal thereto. The output of the trigger circuit 98 energizes or controls the energization of a relay coil 100. The relay coil 100 controls an armature 102 which is normally biased into engagement with a first contact 104 of a relay 106. This engagement completes a circuit including a battery 108, a capacitor 110, and a resistor 112, whereby the capacitor 110 is charged to the battery potential. When the relay coil 100 is energized, the armature 102 is moved into engagement with the contact 114 of the relay 106 with the result that the capacitor 110 is discharged through the resistors 77 and 112.

In the operation of the system described above, the drive motor 70 drives the drive gear 42 mounted on the shaft 16 through the wavelength drive 46 and the gear 44. As the shaft 16 rotates, the cam 14 drives a mirror linkage or a filter control mechanism and the working surfaces 18, 20, 22 and 24 of the cam 12 drive a grating through several orders as described in Patent No. 2,948,185. In Patent No. 2,948,185 means were provided for deactivating the pen motor and slightly reversing the mirror position when the cam follower was on the non-working or reverse surfaces of the grating cam, with the result that blank intervals were left on the chart separating the various orders.

As pointed out in the aforecited patent, the slight reverse motions of the mirror are an accommodation to the slight overlapping of wavelength between successive grating orders, as desirably built into and determined by the contours of the grating cam. In the present invention, the opaque areas 36, 38 and 40 on the otherwise transparent disc form an order control pattern which interrupts the beam of radiation falling on the radiation detector 56 between preselected wavelengths which reoccur in the successive orders. The areas 36, 38 and 40 of the order control pattern all have the same radius and are provided with angular dimensions equal to the angles through which the cam 12 turns while the cam follower 26 is cooperating with the surfaces of the cam between the preselected, reoccurring wavelengths in the first and second order, the second and third order and the third and fourth order. The term "non-working surfaces" as utilized herein is defined as those portions of the cam 12 that lie within these angles and is illustrated for two successive orders only by the angle $\alpha$ in FIG. 1. The term "working surfaces" as used herein is defined as those portions of the cam 12 that lie between the two preselected wavelengths within one order and is illustrated for one order only by the angle $\beta$. It should, however, be understood that the angles between the successive orders, one of which has been designated $\alpha$ in FIG. 1, are not necessarily equal, nor are the angles within an order, one of which has been designated $\beta$ in FIG. 1, necessarily equal. Thus, while the cam follower 26 is cooperating with one of the working surfaces of the cam 12, the beam of radiation from the source 50 to the detector 56 is uninterrupted with the result that the trigger circuit 58 produces no output signal and the relay coil 60 remains unenergized. The contacts 62 and 64 thus remain closed, completing circuits from the power supply to the magnetic clutch 68 and from the radiation detector to the pen servo amplifier 78. The magnetic clutch 68 is energized and the motor 70 drives the chart 74 in the normal manner while the pen motor 80 drives the pen 88 to make a suitable record on the chart 74.

When the cam follower 26 passes the end of the working surface of the cam 12 and begins to cooperate with the beginning of one of the non-working surfaces, the beam of radiation from the source 50 is interrupted by the corresponding opaque area of the order control pattern with the result that no radiation is detected by the detector 56 which then ceases to produce an output signal. The absence of an input to the trigger circuit 58 results in the production of an output signal by the trigger circuit which energizes the relay coil 60. When the relay coil 60 is energized, the contacts 62 and 64 are opened with the result that the circuit to the magnetic clutch is broken and it is de-energized, interrupting the mechanical coupling between the drive motor 70 and the chart drive mechanism 72 and stopping the chart 74 from further movement. The circuit to the pen servo amplifier is also broken so that the pen motor ceases to drive the pen 88. No further markings may be made on the chart until the broken circuits are restored.

The motor 70 continues to rotate and drives the cam 12 through a predetermined angle $\alpha$ during which period the grating completes its oscillatory cycle, is repositioned at the beginning of the second order and begins scanning the second order. Since the angular dimension of the corresponding opaque area of the order control pattern is exactly equal to the angle between the desired reoccurring wavelength in the two successive orders, the radiation from the source 50 again falls on the detector 56 at the precise instant when the cam 12 begins to cooperate with the next working surface. When the radiation again falls on the detector 56, the trigger circuit ceases to produce an output and the relay coil 60 is de-energized. The contacts 62 and 64 close and the magnetic clutch 68 again couples the drive motor 70 to the chart drive mechanism 72, and the pen motor is again energized so that no blank intervals occur and a complete spectrum is obtained. The identical procedure repeats itself for the transition between the second and third order and for the transition between third and fourth orders.

As the motor 70 drives the shaft 16 and disc 34, the pattern 48 is driven past the radiation source 90, preventing radiation from this source from reaching the detector 96 except when one of the transparent portions 49 of the pattern 48 is rotated into position intermediate the source 90 and detector 96. In response to this radiation pulse, the detector 96 produces an output signal which triggers the trigger circuit 98 with the result that the relay coil 100 is energized and the armature 102 is moved from engagement with contact 104 to engagement with contact 114. The capacitor 110 discharges through the resistors 77 and 112. The discharge of the capacitor across resistor 77 causes a pulse to be applied to the pen servo amplifier 78, resulting in the pen 88 making a spike on the record. The height of the spike is determined by choosing suitable values of resistance for the resistors 77 and 112. The spike provides an extremely accurate measure of wavelength on the chart since it is synchronized with the wavelength readout system and the absolute position of the shaft and cam assembly. The use of these spikes frees the record analyzer from dependence on pre-marked charts and thus obviates any errors due to paper stretch or the like.

While the present invention has been described and illustrated in connection with a four-lobe grating cam, it should be obvious to those skilled in the art that any suitable cam may be used within the scope of the present invention. It should be obvious also that, if desired, the disc 34 could be generally opaque and the order control pattern made up of the areas 36, 38 and 40 could be transparent so that radiation would reach the sensor 56 only when the cam follower was cooperating with the non-working surfaces of the cam. In this event, the trigger circuit would be designed to produce an output only when it receives an input from the radiation detector. In like manner, the pattern 48 could be transparent and the portions 49 opaque. The sources and detectors could also be placed on the same side of the disc with the disc transparent and the control patterns reflective, or vice versa. If desired, the optical system could be replaced by an electromagnetic system. In this event, the various patterns could be formed of a ring-shaped band of a suitable magnetic material, for example, $Fe_3O_4$, programmed with the desired signals in the well-known manner. The radiation detectors 56 and 96 would, of course, be replaced by suitable reading heads. The rest of the apparatus would remain as shown.

The invention may be embodied in other specific forms not departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

I claim:

1. In a spectrophotometer of the type having a monochromator including a cyclically oscillating grating, a grating cam having working and non-working surfaces mounted on a shaft, and a cam follower and linkage mechanism for oscillating the grating in response to rotation of the shaft and the grating cam; a recorder including a chart, a chart drive mechanism, a pen for making a record on said chart and a pen motor for driving said pen; a motor, said motor being coupled to said shaft and said chart drive mechanism for driving said shaft and said chart drive mechanism; and a radiation detector responsive to radiation passing through said monochromator for controlling said pen motor, the improvement comprising:

a disc mounted on said shaft for rotation therewith and with said cam;

a source of radiation positioned adjacent said disc;

a radiation detector positioned adjacent said disc;

pattern means mounted on said disc cooperating with said source and said detector to produce an output signal, said pattern means corresponding to said non-working surfaces of said cam as said disc, cam and shaft rotate; and means coupled to said detector and responsive to said output signal to decouple said motor from said chart drive mechanism and to deactivate said pen motor.

2. In a spectrophotometer, the combination comprising:

a rotatable shaft;

a cam mounted on said shaft, said cam having at least one working surface and one non-working surface;

a disc mounted on said shaft, said disc having at least one portion having a characteristic different from the remainder of the disc, said portion corresponding in angular position to said non-working surface of said cam;

a source of radiation positioned adjacent said disc;

a radiation detector positioned adjacent said disc;

said source and said detector being positioned whereby an optical path including said disc is formed therebetween, said portion of said disc altering said optical path as said disc rotates, said alteration of said optical path causing said detector to produce an output signal;

a recorder having a chart and a chart drive mechanism;

a drive motor for driving said chart drive mechanism; and means for coupling said motor drive to said chart drive mechanism, said means being responsive to said output signal for decoupling said chart drive mechanism from said drive motor.

3. The apparatus of claim 2 wherein said recorder also includes a pen and a pen motor and means responsive to said output signal for deactivating said pen motor.

4. The apparatus of claim 2 wherein said disc is transparent and said portion is opaque.

5. In a spectrophotometer of the type having means for producing radiation of varying wavelengths and for separating the spectral orders of said radiation, said spectral orders having at least one common wavelength, said radiation impinging upon a sample, means for measuring an optical property of said sample that varies with said wavelength, a recorder connected to said means for producing a record of said optical property as a function of the wavelength, the improvement comprising:

means connected to said recorder and operable with said first named means to render said recorder inoperable when said first named means produces said common wavelength in one order and to render said recorder operable when said first named means produces said common wavelength in the next succeeding order whereby said recorder produces a continuous uninterrupted record of the property of said sample as the wavelength of said radiation is varied.

6. The apparatus according to claim 2 wherein said source of radiation and said radiation detector are positioned on opposite sides of said disc.

7. In a spectrophotometer of the type having a monochromator including a cyclically oscillating grating, a grating cam having working surfaces and non-working surfaces mounted on a shaft and a cam follower and linkage mechanism for oscillating said grating in response to the rotation of said shaft and said grating cam; drive means coupled to said shaft for rotating said shaft; a recorder including a chart, a drive mechanism, a pen for making a record on said chart and a pen motor for driving said pen, and drive means coupled to said chart drive mechanism for driving said chart drive mechanism in synchronism with said shaft; a radiation detector responsive to the radiation passing through said monochromator for controlling said pen motor, the improvement comprising:

a disc mounted on said shaft for rotation therewith;
a radiation source positioned adjacent said disc;
a radiation detector positioned adjacent said disc;
pattern means formed on said disc and providing a pattern of first and second optical characteristics, one of said characteristics corresponding in angular position to said non-working surface on said cam and the other characteristic corresponding in angular position to said working surface, said source, detector and pattern means cooperating to produce a signal indicative of the surface on said cam engaged by said cam follower; and
means coupled to said detector and responsive to said signal to decouple said chart drive mechanism and stop said chart when said cam engages said non-working surfaces whereby a continuous unbroken record as a function of wavelength is provided over at least two successive orders of said grating.

8. The improvement of claim 7 wherein said disc is provided with second pattern means having indicia corresponding to the wavelength selected by said monochromator, and means connected to said pen drive means and responsive to said indicia to cause said pen to inscribe marks on said chart indicative of said wavelength.

References Cited by the Examiner

UNITED STATES PATENTS

| | | | |
|---|---|---|---|
| 1,901,400 | 3/1933 | Morrison | 88—14 |
| 1,985,044 | 12/1934 | Lyle | 88—14 |
| 2,088,297 | 7/1937 | Koenig | 88—14 |
| 2,184,156 | 12/1939 | Bowles | 88—14 |
| 2,562,525 | 7/1951 | Cary | 88—14 |
| 2,621,298 | 12/1952 | Wild et al. | 88—14 |
| 2,879,937 | 3/1959 | Coles et al. | 88—14 |
| 2,948,185 | 8/1960 | Ward et al. | 88—14 |

JEWELL H. PEDERSEN, *Primary Examiner.*

RONALD L. WIBERT, *Examiner.*